UNITED STATES PATENT OFFICE.

RUSSELL THAYER, OF PHILADELPHIA, PENNSYLVANIA.

PROCESS FOR THE EXTRACTION OF PLATINUM AND LIKE METALS OF THE PLATINUM GROUP FROM SANDS AND ORES.

1,281,379.

Specification of Letters Patent.

Patented Oct. 15, 1918.

No Drawing.

Application filed September 1, 1917. Serial No. 189,257.

*To all whom it may concern:*

Be it known that I, RUSSELL THAYER, of Philadelphia, in the county of Philadelphia and State of Pennsylvania, have invented certain new and useful Improvements in Processes for the Extraction of Platinum and like Metals of the Platinum Group from Sands and Ores, whereof the following is a specification.

My invention is particularly addressed to the recovery of the platinum which occurs in a state of exceedingly fine comminution in sands and ores, but includes certain other metals of the platinum group, such as iridium and osmium, which are frequently found in association therewith, in a similar comminuted condition.

I have found that in the finely divided and possibly colloidal condition in which the metals referred to, are found in nature in sands and certain similar ores, the metal is highly susceptible to the direct attack of chlorin, forming a compound which can be largely volatilized, and thus carried away from the mass by a proper current to a suitable collecting receptacle. As this compound is soluble in water, any residual compound which may remain in the mass can be leached out, and the entire removed compound can be subsequently treated for precipitation of the metal.

In many instances the sands in which the finely divided platinum occurs can be treated without further grinding, but in some cases, as, for instance, where the ore is of rock-like character, it should be finely ground in order to release or expose as far as possible the minute particles of the metal.

In carrying out the process I preferably place in a retort a charge of the sand, or ground rock, and introduce into the base of the retort a pipe leading from a supply of chlorin gas under pressure. The chlorin is passed upward through the charge with a pressure sufficient to cause a definite and continuous current, so that the gas after being diffused throughout the charge passes steadily out from the effluent end of the retort, whence it is conducted to a receptacle containing water. Under these conditions it will be found that the platinum is not only taken up by, and combined with, the chlorin to a very large degree, but that the resultant product is volatilized and carried off in the form of minute solid particles. My belief is that while the action is largely chemical, resulting in the formation of an actual compound in the nature of a combination of the metal with the chlorin, the minute metallic particles are to some extent carried over as such. Under these conditions, however, the metallic particles will be detained in the water, and can readily be recovered therefrom by known processes, together with the dissolved compound.

I prefer to subject the ore to the action of the chlorin at a temperature of about 900 degrees F., as I have found that this tends to facilitate the action of the gas current.

I do not, however, limit my claims to the employment of the particular temperature mentioned, since I believe that the gas current commences to act at a much lower temperature, possibly as low as 212 degrees Fahrenheit. While for commercial purposes the use of a temperature nearly approaching 900 degrees Fahrenheit, is recommended upon the grounds of economy and efficiency, I find it impossible to define with exactness the theoretical range of temperatures, within which the characteristic mode of operation may be attained, and can only state that its upper limit is substantially below the melting point of the metal, and its lower limit not substantially below 212 degrees Fahrenheit.

Instead of using gas derived from a separate producer as above described, I contemplate mixing with the charge of sands or ground ore, any known combination capable of evolving chlorin under the influence of heat, so that the gas can be generated *in situ*.

As above stated, the invention is not restricted to platinum alone, but applies to such metals as iridium and osmium, commonly associated therewith, and which may be classified as the exceedingly refractory and heavy metals of the platinum group.

Having thus described my invention, I claim:

1. The hereinbefore described process for the extraction of finely comminuted platinum and similar metals from their sands or ores, which consists in diffusing a current of heated chlorin gas through an inclosed charge of such sand or ore; conducting the gas current after passage through the charge to a receptacle containing a solvent of the compound formed; collecting the dissolved and detained metal in the solvent, and finally recovering the metal.

2. The hereinbefore described process for the extraction of finely comminuted platinum and similar metals from their sands or ores, which consists in diffusing a current of heated chlorin gas through an inclosed charge of such sand or ore; conducting the gas current after passage through the charge to a receptacle containing a solvent of the compound formed; collecting the dissolved and detained metal in the solvent; leaching the residuum of the charge to remove any remainder of the compound formed; and finally recovering the metal.

In testimony whereof I have hereunto signed my name at Philadelphia, Pennsylvania, this thirtieth day of August, 1917.

RUSSELL THAYER.

Witnesses:
  JAMES H. BELL,
  E. L. FULLERTON.